F. HOLDEN.
ELECTRICAL MEASURING INSTRUMENT.
APPLICATION FILED OCT. 11, 1913.

1,189,109.

Patented June 27, 1916.

UNITED STATES PATENT OFFICE.

FRANK HOLDEN, OF LONDON, ENGLAND, ASSIGNOR TO GENERAL ELECTRIC COMPANY, A CORPORATION OF NEW YORK.

ELECTRICAL MEASURING INSTRUMENT.

1,189,109.   Specification of Letters Patent.   Patented June 27, 1916.

Application filed October 11, 1913. Serial No. 794,730.

*To all whom it may concern:*

Be it known that I, FRANK HOLDEN, a citizen of the United States, residing at London, England, have invented certain new and useful Improvements in Electrical Measuring Instruments, of which the following is a specification.

This invention relates to improvements in electrical measuring instruments of the type in which the movements of a rotating disk or armature are recorded on a registering train. In such meters, and particularly in those in which the moving element is a copper or other disk or cup rotating in a bath of mercury, changes in the temperature cause a considerable variation in the "constant" of the meter owing mainly to the change of resistance of the disk or cup.

The object of this invention is to provide means for compensating for these changes of temperature and so prevent the "constant" of the meter from varying, and to this end it consists in providing mechanism sensitive to changes in temperature, for transmitting the movement of the rotating element to the registering train.

The features of my invention which I consider patentably novel are definitely indicated in the claims appended hereto.

Figure 1:
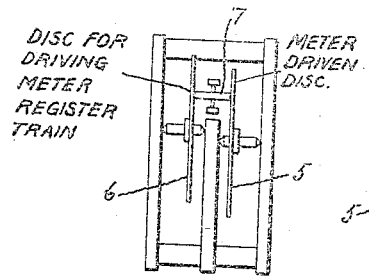
Figure 2:
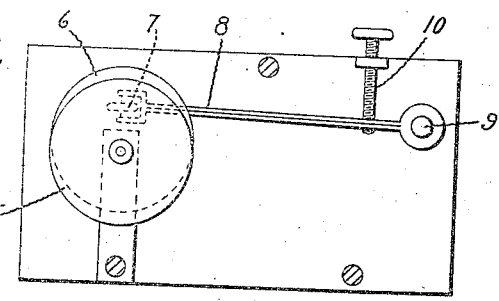
Figure 3:
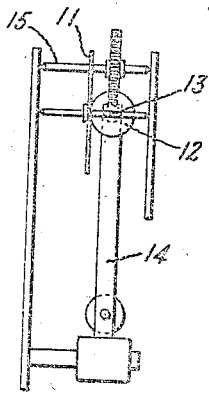
Figure 4:
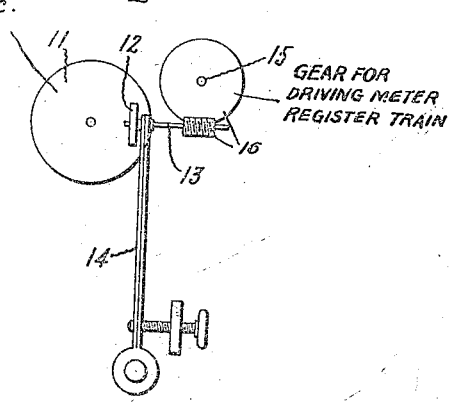

The details of construction and mode of operation of an electrical measuring instrument embodying the features of my invention will be understood from the following description taken in connection with the accompanying drawings, wherein two means for carrying my invention into effect are illustrated, and in which;

Figures 1 and 2 are end and side elevations respectively of a device adapted for use in an electric meter and embodying the features of my invention; and; Figs. 3 and 4 are similar views of a modified construction.

In carrying my invention into effect according to the modification illustrated in Figs. 1 and 2, I provide a disk 5 driven either directly or through gearing by the movable or rotatable element of the instrument or meter. A second disk 6 is provided which is connected by gearing with the registering train. These two disks are so arranged that their axes are parallel to each other but are out of alinement and their faces are arranged so as to lie in parallel planes a short distance apart. In the space between the faces of these two disks I arrange a friction wheel 7 adapted to transmit motion from the disk 5 connected with the meter shaft or spindle to the disk 6 connected with the registering train. This friction wheel 7 is carried by a bi-metallic or thermostatic strip 8 which may be rigidly fixed at its outer end to the pin 9 and provided with an adjustable stop 10 so that the normal position of the friction wheel can be adjusted by hand.

In operation, the friction wheel 7 moves radially with changes of temperature due to the bi-metallic strip 8 bending in one direction or the other. Owing to the disalinement of the axes of the disks 5 and 6 the ratio of the speeds of the driving and driven shafts will be varied.

According to the modification illustrated in Figs. 3 and 4, instead of employing a pair of friction disks with parallel faces and a transmitting wheel carried by the bi-metallic strip engaging the surfaces of both, I employ a single disk 11 and a friction wheel 12 engaging its face. The disk 11 is designed to be driven by the rotatable meter shaft. The friction wheel is slidably mounted on a spindle 13 and is adapted to drive the shaft 15 by means of worm gearing 16. The shaft 15 is designed to be operatively connected to the register train of the meter. The wheel 12 is provided with a hub or sleeve to which the bi-metallic strip 14 is connected so that, as the strip bends, owing to changes in temperature, the position of the wheel 12 on the spindle 13 will be altered and the speed at which the shaft 15 and the registering train is driven varied.

Other modifications which fall within the scope of my invention, of the manner of transmitting the motion of the rotating element to the registering train through temperature sensitive mechanism, than those described above, will be obvious to those skilled in the art. Accordingly, I do not desire to limit myself to the particular construction and arrangements of parts here shown, but aim in the appended claims to cover all modifications which are within the scope of my invention.

What I claim as new and desire to secure by Letters Patent of the United States is:—

1. In an electric meter having a rotatable element, and a driven element, mechanism for compensating for changes in speed of said rotatable element due to temperature variations, said mechanism comprising means operatively connecting the rotatable element to the driven element, and means sensitive to temperature changes operatively related to said last mentioned means for controlling the ratio of the rates of rotation of the rotatable element and the driven element.

2. In an electrical measuring instrument having a movable member and a driven member, mechanism for compensating for changes in speed of said movable member due to temperature variations comprising means operatively connecting said two members, and temperature responsive means operatively related to the means connecting said two members and adapted to vary the ratio of the rates of movement of the two members.

3. In an electrical measuring instrument having a movable member and a registering train, means for maintaining the "constant" of the instrument approximately independent of temperature variations comprising mechanism between the movable member and the registering train of the instrument which is sensitive to temperature changes and which varies the ratio of the rates of movement of the driving and driven members.

4. In an electrical measuring instrument having a movable member and a registering train, a friction disk operatively connected to the registering train of the instrument, a friction wheel adapted to be driven by the movable member of the instrument and engaging the friction disk so as to transmit motion from the movable member to the registering train, and a temperature sensitive support for said friction wheel adapted to vary its point of contact with said disk in accordance with changes of temperature.

5. In an electrical measuring instrument having a movable member and a registering train, a pair of friction disks mounted on axes which are parallel but out of alinement with each other, one of said disks being adapted for connection to the movable member of the instrument, while the other disk is adapted for connection to the registering train of the instrument, a friction wheel engaging both of said disks so as to transmit motion from one disk to the other disk, and a bi-metallic support for the friction wheel adapted to vary the points of contact between the disks and the wheel in accordance with variations in temperature.

In witness whereof, I have hereunto set my hand this 1st day of October, 1913.

FRANK HOLDEN.

Witnesses:
CHARLES H. BURGESS,
FREDK. J. SHOYLES.